United States Patent [19]

Hallberg et al.

[11] Patent Number: 4,828,867
[45] Date of Patent: May 9, 1989

[54] METHOD OF EXTRACTING HOP PELLETS WITH LIQUIFIED CARBON DIOXIDE

[75] Inventors: Wilfried Hallberg; Herbert Jekat, both of Trostberg; Erwin Schütz, Palling; Kurt Stork, Münchsmünster; Heinz-Rüdiger Vollbrecht, Stein/Traun, all of Fed. Rep. of Germany

[73] Assignee: SKW Trostberg Aktiengesellschaft, Trostberg, Fed. Rep. of Germany

[21] Appl. No.: 65,087

[22] Filed: Jun. 18, 1987

Related U.S. Application Data

[63] Continuation of Ser. No. 666,128, Oct. 31, 1984, abandoned, which is a continuation of Ser. No. 437,790, Oct. 29, 1982, abandoned.

[30] Foreign Application Priority Data

Nov. 11, 1981 [DE] Fed. Rep. of Germany ....... 3144828

[51] Int. Cl.$^4$ .......................... C12C 3/00; A23P 1/02; A23L 1/42
[52] U.S. Cl. .................................... 426/600; 426/425; 426/285
[58] Field of Search ............... 426/600, 615, 425, 454, 426/512, 285

[56] References Cited

U.S. PATENT DOCUMENTS

| 2,931,728 | 4/1960 | Franck et al. | 426/432 |
| 3,441,416 | 4/1969 | Depmer | 426/600 |
| 3,787,586 | 1/1974 | Hokanson et al. | 426/600 |
| 4,212,895 | 7/1980 | Laws et al. | 426/600 |
| 4,344,978 | 8/1982 | Sharpe et al. | 426/600 |
| 4,511,508 | 4/1985 | Vollbrecht et al. | 426/425 |

Primary Examiner—Elizabeth C. Weimar
Attorney, Agent, or Firm—Felfe & Lynch

[57] ABSTRACT

The invention relates to a method of extracting natural materials with carbon dioxide, in which the materials are used in the form of pellets of a diameter of 1.5 to 4.0 mm and a length of 1.5 to 10 mm, and of a bulk density of 0.4 to 0.6 kg/l, this method being highly suitable for the carbon dioxide extraction of hop constituents, so that the commonly practiced second grinding becomes unnecessary.

6 Claims, No Drawings

METHOD OF EXTRACTING HOP PELLETS WITH LIQUIFIED CARBON DIOXIDE

This application is a continuation of application Ser. No. 666,128, filed Oct. 31, 1984, now abandoned which is a continuation of Ser. No. 437,790, filed Oct. 29, 1982 now abandoned.

BACKGROUND OF THE INVENTION

The invention relates to a method of extracting natural materials, especially hops.

It has long been known that substances contained in hops can be recovered by extracting the hops with a suitable extractant, such as organic solvents or, in recent times, carbon dioxide, in the subcritical and/or supercritical state. On account of the very low bulk weight of the ground raw hops, of 0.15 kg/l, and for the purpose of reducing the high investment cost involved in the extraction pressure vessel and keeping the transport and storage costs low, it is known to compress the raw hops which are to be extracted with carbon dioxide. This is accomplished first by grinding the raw hops and then pressing to form pellets of a diameter of about 6 mm and a length of about 20 mm. By these means a three- to four-fold compression can be attained. These commercially common hop pellets of the stated dimensions, however, cannot be used directly for extraction with carbon dioxide, since the yield, especially of the desired bitter substances, is too low. In the "Monatsschrift für Brauerei" (180), page 107, it is stated that, for this reason, the hop pellets are first ground, in order then to be able to extract the powder with good yields. However, on account of the grinding machines that are additionally needed, this process calls for greater technical investment. Furthermore, it suffers from the considerable disadvantage that the hops are reheated by the grinding of the pellets, resulting in losses of the desired alpha acids, and also that charging the extraction autoclave with powder fosters tunneling in the extraction bed. The result of this is that, on the one hand, the carbon dioxide flows through these tunnels without becoming laden with the extractable substance, while on the other hand the carbon dioxide does not reach the more tightly packed areas of the bed, resulting in severe losses of the yield of hop extract. Similar problems may also occur in the extraction of substances from other natural materials.

To eliminate the tunneling that occurs in the extraction bed, attempts have already been made to provide the extraction autoclaves with stirrers in order to assure a uniform distribution of the powder. This, however, requires a heavy investment in apparatus in order to achieve a good seal around the stirrer for operation at pressures of as much as 500 bar.

Accordingly, only two alternatives have heretofore been available, namely either to use the ground raw hops whose bulk weight is as unfavorable as in the case of the raw hops themselves, or to use ground pellets for the extraction (J. Instr. Brew. Vol. 87 (1981) 24 to 29, especially 27, column 1, 3rd paragraph). These two alternatives, however, suffer from the disadvantages, described above, of incomplete extraction due to tunneling.

The object of the present invention, therefore, is to devise a method for the extraction of natural materials, especially hops, which will make possible a very complete recovery of the desired substances by extraction with carbon dioxide in a simple manner, without impairment of the valuable extracts.

SUMMARY OF THE INVENTION

It has surprisingly been found that a process in which pellets are used which have after compression a diameter of 1.5 to 4.0 mm, a length of 1.5 to 10 mm and a bulk weight of 0.4 to 0.6 kg/l satisfies these requirements and permits a better yield of the desired extracts to be obtained by extraction with carbon dioxide.

The subject matter of the invention, therefore, is a method of extracting pellets of natural materials, such as, for example, comminuted, preferably ground vegetable or animal products and especially hops, with carbon dioxide, which is characterized by the fact that the pellets after compression have a diameter of 1.5 to 4.0 mm, preferably 2.0 to 3.0 mm, and still more preferably of 2.0 to 2.5 mm, a length of 1.5 to 10 mm, preferably 2.0 to 4.0 mm, and a bulk weight of 0.4 to 0.6 kg/l. The pellets are especially those made from raw hops powder. The natural materials are used preferably in dried form.

DETAILED DISCLOSURE

It has surprisingly been found that hop pellets used in the above-stated size in accordance with the invention are extraordinarily well suited for carbon dioxide extraction. This finding is contrary to previous experience in this field. For example, it has always been held that pellets of these dimensions are unsuitable on account of the danger of forming powder by attrition. Consequently, a diameter of 5 to 8 mm has heretofore been recommended for hop pellets (cf. "Brauwelt" 116, No. 26 (1976) 1141 to 1145). Similar good results are surprisingly obtained also with pellets of other natural materials, such as especially those from plants whose leaves or blossoms contain valuable substances, such as pine needles, berries such as juniper berries, or peppers, oil seeds, cardamom, annatto, nutmeg, ginger etc.

Furthermore, the person skilled in the art had to expect that, in the production of attrition-resistant hop pellets of the dimensions specified by the invention, such high temperatures would be produced by the pressing that damage would be done to the hop constituents. Another surprise has been that, by appropriate selection of the press stroke in the pelleting process and of the diameter of the matrix press channels, the thermal stress on the hops can be kept very low.

The pellets used in accordance with the invention are produced preferably by a method of preparing the pellets by pelleting comminuted, preferably ground, natural materials, such as raw hop powder for example, which is characterized by the fact that the pressing process is performed with the use of a press stroke of 5 to 20 mm, preferably 8 to 10 mm, and of pelleting die holes of a diameter of 1.0 to 5.0 mm, preferably of 2.2 to 2.8 mm, at a temperature of not more than 50° C. According to a preferred embodiment, the pressing is performed such that the temperature produced by the pelleting does not exceed 45° C. The temperatures which are to be applied in accordance with the invention can be maintained, if necessary, by appropriate means such as cooling with an inert gas, water or carbon dioxide. When using carbon dioxide as dry ice, preferably an amount of 0.1-1 kg carbon dioxide per kg of pellets is used. The preparation of the pellets is performed conventionally with the use of common pelleting presses.

In accordance with an especially preferred embodiment of the invention, the comminuted, preferably ground natural materials, and especially the hop powder, are mixed with carbon dioxide snow before pelleting. This provides for a thorough cooling of the pellets during the pelleting process. It has been found surprisingly that, in this embodiment of the method of the invention for the preparation of pellets, certain amounts of carbon dioxide are entrapped in the pellets and during and after the pelleting process are released again from the pellets in the form of carbon dioxide gas. The gas thus opens fine channels in the pellets, which promote the subsequent extraction process in an advantageous manner, since thus large surfaces accessible to carbon dioxide attack are exposed within the pellets.

In this manner pellets are obtained, such as hop pellets, for example, which can be extracted directly with carbon dioxide with good yields and relatively low holding times, and permit high yields of unaltered constituents, such as hop extract, for example.

The pellets of the invention are therefore very well suited for a method of producing substances contained in natural materials, especially hops, by extracting the pellets with carbon dioxide. In this manner it becomes possible to eliminate a second grinding, which has heretofore been common practice, whereby the pellets were formerly converted to a form suitable for carbon dioxide extraction.

The following examples will serve for the further explanation of the invention.

EXAMPLES

EXAMPLE 1

Hallertauer Northern Brewer hop cones are ground in a hammermill and then compressed to make pellets, using a pelleting die with a hole diameter of 2.5 mm and a press stroke of 10 mm. After this pelleting process pellets are obtained having a temperature of 50° C., an average diameter of 2.8 mm and an average length of 3.5 mm. The bulk density of the hop pellets is 0.50 kg/l.

EXAMPLE 2

Hallertauer Northern Brewer hop cones are ground in a hammermill and then compressed to pellets. After the hop powder is charged into the pellet press, carbon dioxide snow is added. Pelleting is performed using a die with a hole diameter of 2.5 mm and a press stroke of 10 mm. After pelleting the temperature of the pellets is 43° C. The hop pellets thus obtained have an average diameter of 3.0 mm and an average length of 3.5 mm and have a bulk density of 0.48 kg/l.

Other natural materials, such as dried black or green tea or estragon can be made into pellets in the same manner as described in Examples 1 and 2.

EXAMPLE 3

To illustrate the extractability of the hop pellets of the invention and that of conventional hop pellets as well as ground hop pellets, the following extraction tests were performed:

(a) (Invention)

16.0 kilograms of hop pellets of a diameter of 2.5 mm and an average length of 3.5 mm are extracted with carbon dioxide. The alpha acid yield is about 96.7% of the input amount.

(b) (Comparison)

20 kilograms of hop pellets of a diameter of 6 mm and an average length of 20 mm are extracted with carbon dioxide. The alpha acid yield achieved in this manner is about 90.1% of the input amount.

(c) (Comparison)

13.0 kilograms of ground hop pellets are extracted with carbon dioxide. The yield of alpha acids amounts to 93.9% of the input amount.

It is thus apparent from the above comparative tests that the hop pellets of the invention not only permit a better recovery of the hop constituents than the hop pellets of the prior art, but also a better recovery than the ground hop pellets of the prior art, which actually ought to permit a better extraction on account of the greater exposed surface of the hop material.

EXAMPLE 4

Whole spruce needles are ground in a hammermill and then compressed to form pellets by using a pelleting die with a hole diameter of 2.8 mm, and a press stroke of 10 mm. After the pelleting process, the pellets have a temperature of 47° C. and an average diameter of 2.9 mm and an average length of 3.5 mm. The bulk density of the spruce needle pellets is 0.45 kg/l. These pellets are extracted with $CO_2$. The extract has the unaltered aroma of the starting material, while the extraction residue is virtually odorless.

It will be understood that the specification and examples are illustrative but not limitative of the present invention and that other embodiments within the spirit and scope of the invention will suggest themselves to those skilled in the art.

What is claimed is:

1. A method of extracting substances from raw hop powder wherein the raw hop powder is pelletized and thereafter the substances are extracted directly from the pellets with liquified carbon dioxide, and wherein the pelletizing step comprises pelletizing the raw hop powder to form pellets having diameters ranging from about 1.5 to 4.0 mm, lengths ranging from about 1.5 to 10 mm, and a bulk density from about 0.4 to 0.6 kg/l.

2. The method of claim 1 wherein the pellets have diameters in the range of about 2.0 to 3.0 mm and lengths ranging from 2.0 to 4.0 mm.

3. The method of claim 1 wherein the raw hop powder is mixed with carbon dioxide snow before pelletizing.

4. The method of claim 1 wherein the pelletizing step comprises
   comminuting the raw hop powder and pressing it using a press stroke of 5 to 20 mm and pressing die holes of a diameter from 1.0 to 5.0 mm at a temperature of not more than 50° C.

5. The method of claim 4 wherein the press stroke is 8 to 10 mm, the pressing die hole diameter is 2.2 to 2.8 mm and the temperature is not more than 45° C.

6. The method of claim 4 wherein the product is mixed with carbon dioxide snow before pelleting.

* * * * *